July 3, 1962

R. P. LEDBETTER 3,042,922

MULTIPLE TRACE RECORDER WITH TRACE IDENTIFIER

Filed Aug. 22, 1960

INVENTOR.
ROBERT P. LEDBETTER
BY
*[signature]*
ATTORNEY

July 3, 1962  R. P. LEDBETTER  3,042,922
MULTIPLE TRACE RECORDER WITH TRACE IDENTIFIER
Filed Aug. 22, 1960  2 Sheets-Sheet 2

INVENTOR.
ROBERT P. LEDBETTER
BY
*Jerry J Dunlap*
ATTORNEY 3,042,922
MULTIPLE TRACE RECORDER WITH TRACE
IDENTIFIER
Robert P. Ledbetter, P.O. Box 7344,
Oklahoma City 12, Okla.
Filed Aug. 22, 1960, Ser. No. 50,905
11 Claims. (Cl. 346—45)

This invention relates to multiple trace recorders and more particularly, but not by way of limitation, to a multiple trace recording system in which the pens or styluses utilized to record several traces upon the same portion of a chart are given distinctive actions for the purpose of enabling the various traces to be distinguished, one from the other. The invention also relates to a novel method and apparatus for imparting such distinctive actions to the pens.

In systems for graphically recording information in the form of traces inscribed upon a moving chart, it is frequently desirable to record intelligence received from different sources upon the chart simultaneously. In other instances, it may be convenient or necessary to record differing types of information upon the same chart in consecutive sequence. In either event, in those systems which scribe a trace in the form of a moving line upon the chart, the problem is encountered of distinguishing or identifying the several lines resulting from the recordation of information from differing sources. The lines so formed will frequently cross each other and the origin and termination of the several lines are obscured from the view of an analyst since the charts frequently employed are rolled at each of their ends upon a pair of rollers. In such a situation, it will be apparent that the identity of the several traces will become confused and may result in erroneous interpretation of the simultaneously recorded information. In other words, with the simultaneous or overlapping recordation of several phenomena upon the same length of chart paper, it is necessary for accuracy of interpretation to be able to identify the particular phenomenon with the particular trace by which it is represented.

Several methods directed to the end of enabling the concurrent traces to be distinguished from each other have been proposed previously. Thus, in one system it has been proposed to employ inks of varied colors in the several pens or styluses in order to permit the trace inscribed by a particular pen to be identified by its color. Several disadvantages, however, have been inherent in this method of multiple trace recording, the most notable of which has probably been the impossibility of utilizing the principles of the method in a recording system depending entirely upon electrical phenomena or photographic phenomena for trace formation. Moreover, where the various traces are being inscribed simultaneously, there is a tendency for the multicolored inks employed to intermix where the traces cross each other, thus causing the different colors to lose their distinctiveness.

Another method of trace identification which has previously been proposed consists of imparting distinctive mechanical movements to the stylus which is employed in producing each trace so that the several traces are distinguishable by virtue of the different geometric patterns which are characteristic of each. In some instances, a mechanical movement is translated to the pen or stylus which causes a small pip or wave to be superimposed upon the basic pattern of the trace attributable to the intelligence or information which is being recorded. A difference in the size or frequency of these pips or waves which is characteristic of the several traces enables each of them to be identified from the others. In other instances, the traces have been identified by intermittently breaking the traces in a predetermined manner. Thus, a series of dots and dashes will make up the trace and will be arranged according to a recurrent pattern which is different for each of the traces.

The systems dependent upon an imparted fluctuation in the mechanical movement of the stylus have generally permitted the several traces to be identified with certainty and thus may be said to have achieved the solution to the problem of trace resolution or identification. However, some disadvantage must be associated with such systems in that the mechanism required to impart the peculiar mechanical movement to the stylus has added complexity to the multiple trace recording system which has, in many of the previous systems, become more subject to malfunction due to this complexity. For example, in one multiple trace recording system with which applicant is familiar, a cam having a characteristic geometric configuration is utilized during the recording of each trace to cause an alteration in the strength of an electrical signal which controls the movement of the pen upon the chart. In the case of each individual trace to be recorded, it is necessary to change the particular cam which is utilized. Moreover, the mechanical and electrical elements required to translate the cam motion into fluctuating electrical signals is rather complicated, and adds bulk and expense to the multiple trace recording system.

The present invention, in its broader aspects, contemplates a multiple trace recording system in which the chart paper itself carries a plurality of heterogeneous tracks whose distinctive nature can be easily and accurately imparted to a trace being inscribed on the chart paper. The chart paper employed is, in every case, characterized by a plurality of individually distinctive tracks which are at least equal in number to the number of traces which are to be recorded. The nature of the tracks may vary widely and may thus consist of differing mechanical characteristics, such as a pattern of perforations or raised areas, or the tracks may differ from each other in electrical configuration, such as a plurality of tracks which are each made up of differing geometric patterns of insulating material upon a strip of electrically conducting chart paper. The tracks may also be especially adapted to permit photoelectric control of the stylus movements by having a plurality of distinctively arranged perforations or transparent areas which permit light to pass through the chart in accordance with a predetermined pattern.

Whatever the form or nature of the several tracks which are utilized, the invention in each case is characterized by the location of such control tracks upon the chart paper which is to be utilized for recording the traces. The movements or recording action of the pen or stylus employed is keyed to the tracks, and the distinctive pattern characteristic of any one track is reflected in the pattern of the trace inscribed by the stylus associated with that particular track. In effect, the utilization of cams or other separate mechanical or electrical control means requiring individual design and separate manufacture and shipment is eliminated by the simple and convenient procedure of forming the control means as an integral part of the chart which must, in any event, be utilized in systems of this type. In this manner, it is possible to obtain a substantial saving in manufacturing costs. The system so produced is also less subject to mechanical or electrical failure during the operating life of the device and no additional moving parts are necessary to achieve these ends.

In a preferred embodiment of the present invention, the several tracks located on the recording chart consist of distinctive linear geometric patterns of small spaced areas of electrically insulating material. The chart itself is constructed of an electrically conducting material and is passed over the usual rollers during recordation of the traces. One of the rollers is connected to electrical ground. A sensing head comprising an electrically conducting brush constantly contacts the side of the chart paper which bears the several tracks, and as the chart paper is wound upon the rollers, the brush passes over the several areas of the electrically insulating material which make up one of the tracks. A grounded source of electromotive force is connected to the sensing head so that when the brush is in contact with the electrically conducting chart paper, an electrical circuit will be completed through the chart paper and grounded roller. When this circuit is thus completed, a high voltage generator which is connected to the source of electromotive force remains de-energized. However, when the brush contacts the areas of insulated material making up or constituting one of the several tracks, the circuit through the brush and chart paper is opened and the high voltage generator is energized. The generator then delivers high voltage to an electric stylus which then makes a visible mark upon the electrically conducting paper. In this manner, the geometric configuration of a predetermined one of the tracks may be duplicated in the trace marked out by the electric stylus on the chart paper.

The invention also contemplates certain novel modified embodiments by which the method of the invention may be performed. Thus, instead of utilizing tracks consisting of spaced areas of electrically insulating material, tracks consisting of spaced perforations or areas of transparent material may be utilized in combination with multiple trace recorders in which electromagnetic radiation recording is utilized.

It is accordingly an object of the present invention to provide a multiple trace recording system which is provided with compact and relatively inexpensive means for imparting a distinguishing characteristic to the several traces which are to be recorded.

It is a further object of the present invention to provide a multiple trace recording system which is characterized by a chart having tracks of differing geometric configuration thereon, and is further characterized in having means for duplicating the geometric configuration of any one of the several tracks in one of the traces which is being inscribed upon the chart paper.

A further object of the present invention is to provide a multiple trace recording system having a plurality of tracks on the recording chart employed in such systems, which tracks are each electrically different from the other.

Another object of the present invention is to provide a novel method of imparting a distinguishing characteristic to the several traces produced by a multiple trace recording system.

An additional object of the invention is to provide a multiple trace recording system which has relatively few moving parts, and which is characterized by a long and trouble-free operating life.

Other objects and advantages of the present invention will become apparent from the following detailed description, when considered conjunctively with the accompanying drawings, in which.

Figure 1:
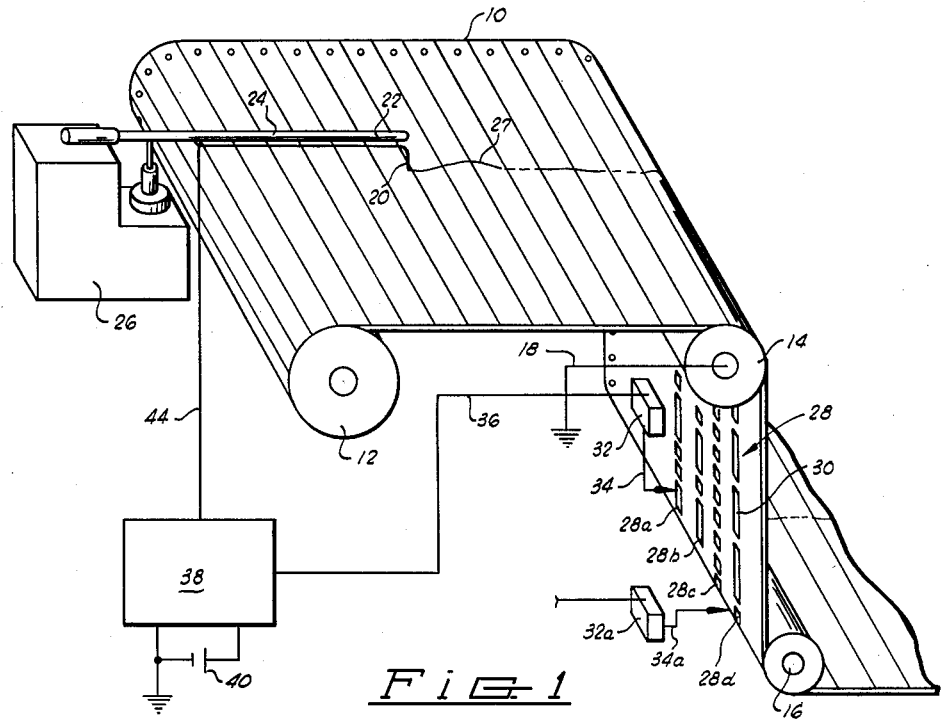
FIGURE 1 is a perspective view of a preferred embodiment of the multiple trace recording system of the present invention with some of the elements thereof illustrated schematically.

Referring now to the drawings in detail, and particularly to FIG. 1, reference character 10 designates a recorder chart upon which a plurality of traces are to be recorded. In the preferred embodiment illustrated in FIG. 1, the chart 10 is constructed of electrically conducting material and is reeled upon, and originates at, a roller 12. The chart 10 is passed over rollers 14 and 16 and is caused to move from roller 12 toward rollers 14 and 16 by a suitable mechanism (not shown). The roller 14 is connected to ground by an electrical lead 18.

An electrical pen or stylus 20 is supported at one end 22 of an arm 24 and is permitted by the arm to ride lightly upon a medial portion of the span of the chart 10 between rollers 12 and 14. A suitable pen motor 26 receives a signal representative of the variable to be recorded, and transfers the signal to the arm 24 in the form of mechanical motion acting transversely with respect to the direction of movement of the chart 10. A trace 27 is scribed upon the chart 10 by the stylus 20.

A plurality of tracks, designated generally by reference character 28, are carried on the side of chart 10 opposite its side upon which the trace 27 is to be recorded. These tracks 28, which are severally designated by reference characters 28a, 28b, 28c, and 28d, are each comprised of a series of aligned, spaced areas of electrically insulating material 30. The arrangement of the areas of insulating material 30 differs in the case of each of the tracks 28a, 28b, 28c, and 28d so that each track is distinct from each of the other tracks.

A sensing head 32 carrying an electrically conducting brush 34 is positioned adjacent the chart 10 so that the brush 34 constantly contacts the side of the chart 10 which carries the tracks 28. The size of the brush 34 is, however, such that it may contact the areas of insulating material 30 without simultaneously contacting any part of the electrically conducting chart 10. Thus, as the chart 10 moves over the rollers 14 and 16, the brush 34 is positioned to follow one of the tracks 28a, 28b, 28c, or 28d, alternately contacting the areas of insulating material 30 and the intervening portions of the chart 10. Under some circumstances of operation which will be explained below in greater detail, it may be desirable, or even necessary, to provide additional sensing heads and brushes for simultaneously tracking or scanning two or more of the tracks. I have therefore illustrated a second sensing head 32a and brush 34a which are positioned to scan the track 28d during operation of the device.

The sensing head 32 and its electrically conducting brush 34 are connected by an electrical lead 36 to a high voltage generator 38 and control the operation of the high voltage generator. A source of electromotive force 40 is connected to the high voltage generator which is also connected by electrical lead 44 to the electrical stylus 20. Suitable control means (not shown) are included in the electrical circuit of the high voltage generator 38 so that when the circuit through the sensing head 32 and electrical brush 34 is closed by contact of the brush with the electrically conducting chart, substantially no current will flow to the electrical stylus. Conversely, when the circuit through the brush 34 is opened by contact of the brush with an area of electrically insulating material, the high voltage generated by the generator 38 is applied to the electrical stylus 20.

*Operation*

As has been previously explained, the need for giving individual identity to the several traces to be recorded upon the chart 10 arises from the fact that these traces will concurrently extend along substantially the same portion of the chart and will often randomly cross each other in a manner which makes identification difficult. Let it first be assumed that it is desired to record a particular variable such as temperature, pressure or volume, which, for convenience of explanation, will be designated as variable X. Signals fluctuating according to the change of variable X will be directed to the pen motor 26 in any one of several ways well understood in the art. The pen motor 26 will convert the signals to motion imparted to the arm 24, which will in turn cause the stylus 20 to scribe an appropriate curve or trace 27 upon the chart 10.

It is frequently desirable to record other variables upon the same portion of chart upon which the trace representing variable X has been recorded. For example, a side-by-side continuous comparison of temperature and pressure conditions is often extremely useful. In some situations, the variables may conveniently be recorded simultaneously; in other situations, one or more might be initially recorded, and additional ones later recorded upon the same chart. In either event, the traces which represent the several variables must, in some manner, be made distinguishable from each other.

The preferred embodiment of the present invention illustrated in FIG. 1 functions to impart a distinctive characteristic to each of the traces. As described above, the chart 10 is constructed of an electrically conducting material and carries upon one of its sides a plurality of tracks 28 comprising a series of spaced areas of electrically insulating material 30. As the chart 10 moves over the rollers 14 and 16, the electrically conducting brush 34 moves along the track 28a, alternately contacting insulated areas 30 and portions of the electrically conducting chart 10 therebetween. Since the roller 14 is grounded, and since the source of electromotive force 40 is also grounded, an electrical circuit is made through the high voltage generator 38 and the brush 34 when it contacts the electrically conducting chart 10. However, when the circuit so made is opened by the interposition of one of the areas of insulating material 30, the current is conducted through electrical lead 44 and high voltage is imposed upon electrical stylus 20. This results in a visible mark of distinctive character being scribed upon the chart 10 by the stylus 20.

From what has been said thus far, it will be apparent that the geometric arrangement of the areas of insulated material making up the track 28a will be reproduced in the trace 27. If it is assumed that variable X is being recorded and is represented by trace 27, the geometric configuration of track 28a may be said to characterize the variable X trace. If, after recording variable X, it is desired to later record one or more additional variables on the same portion of the chart 10 which bears the trace 27 representing variable X, the chart 10 is rewound, the sensing head 32 and brush 34 are shifted to enable the latter to scan a different one of the tracks 28, and the chart is again advanced to allow the electric stylus 20 to move along the same portion of the chart 10 which bears the trace 27.

On the other hand, when it is desirable or necessary to simultaneously record a plurality of variables, this may be easily accomplished by providing a plurality of sensing heads and brushes corresponding in number to the number of variables which are to be simultaneously recorded. These, of course, are each positioned adjacent a different one of the tracks 28 with the brush aligned to scan the respective track. This arrangement is illustrated in FIG. 1, where the sensing head 32 and electrically conducting brush 34 are positioned for scanning the track 28a and for identifying variable X with track 28a while sensing head 32a and electrically conducting brush 34a are positioned for scanning track 28d. The electrical lead from the sensing head 32a is broken away, but it will be understood that a second electrical stylus in addition to stylus 20 will be employed for recording a second variable, which may be termed variable Y, and will be connected through a high voltage generator to the sensing head 32a in the same manner as stylus 20 is connected to sensing head 32.

Figure 2:
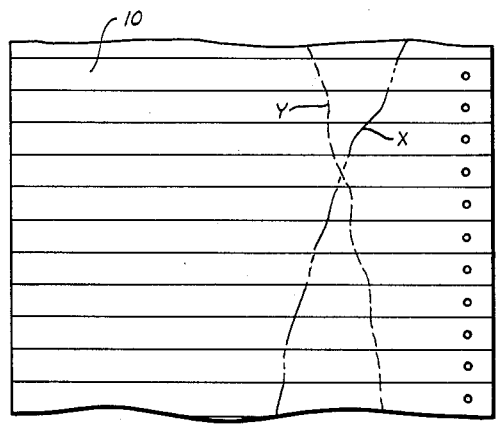
FIGURE 2 is a plan view of a portion of a recording chart illustrating several traces produced by the preferred embodiment illustrated in FIG. 1.

The appearance of a section of the chart 10 after traces representing variables X and Y have been scribed thereon is illustrated in FIG. 2. It can be clearly seen that the traces are distinctive from each other, and that the trace representing variable X is identifiable with the track 28a, while the trace representing variable Y is identifiable with the track 28d. It would also be possible with the four-track arrangement of FIG. 1 to produce two additional distinctive traces corresponding to tracks 28b and 28c. Thus, a total of five variables could be simultaneously or sequentially recorded upon the same section of chart paper—four corresponding to the four tracks, and a fifth uninterrupted trace using no track.

Figure 3:
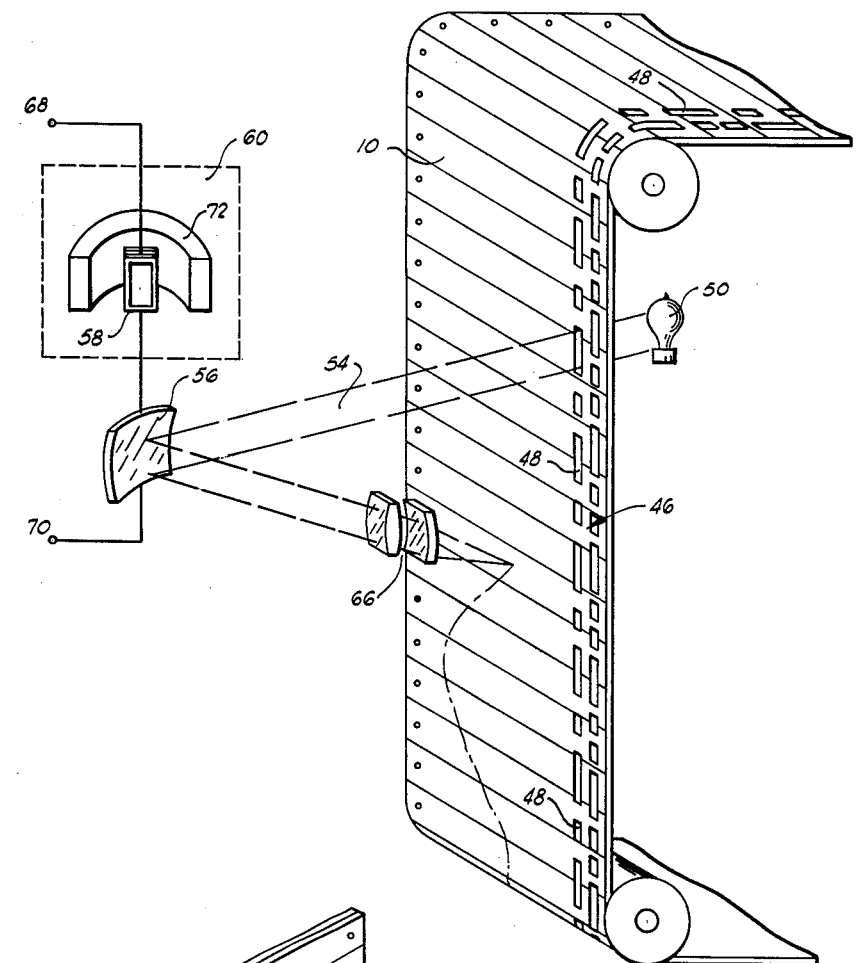
FIGURE 3 is a perspective view of a modified embodiment of the present invention with some of the elements thereof illustrated schematically.

A modified embodiment of the present invention is illustrated in FIG. 3. The tracks 46 shown in FIG. 3 are located on a recording chart 10, as are the tracks 28 of the preferred embodiment of FIG. 1. However, the tracks 46 are comprised of a plurality of spaced transparent areas 48 instead of the spaced areas of insulating material 30 shown in FIG. 1. In this embodiment the chart 10 is necessarily opaque. The transparent areas 48 may consist simply of perforations in the chart, or may consist of small portions of transparent material. This type of track lends itself well to use with photographic recording systems, a typical example of which is illustrated in FIG. 3.

A source of light 50 is positioned on one side of the chart 10 so that light from the source falls upon the chart and passes through the transparent areas 48 as they pass opposite the light source. A beam of light 54 which has passed through one of the transparent areas 48 strikes a parabolic mirror 56 which is attached to the windings 58 of a galvanometer 60. The mirror 56 reflects the light beam 54 toward the chart 10 which, in the embodiment depicted in FIG. 3, has a recording surface of photosensitive material. Before striking the photosensitive surface of the chart 10, the beam of light 54 is concentrated and reduced approximately to a point by means of a set of collimating lenses 66.

An electrical signal representative of the variable to be recorded is applied between the terminals 68 and 70 and flows through the galvanometer windings 58 in the magnetic field of the magnet 72, causing the windings to turn in response to the variable to be recorded. The parabolic mirror 56 is thus rotated in response to the signal representing the variable to be recorded, and causes the light beam to be shifted laterally of the chart 10 in a manner indicative of changes in the value of the variable.

Figure 4:
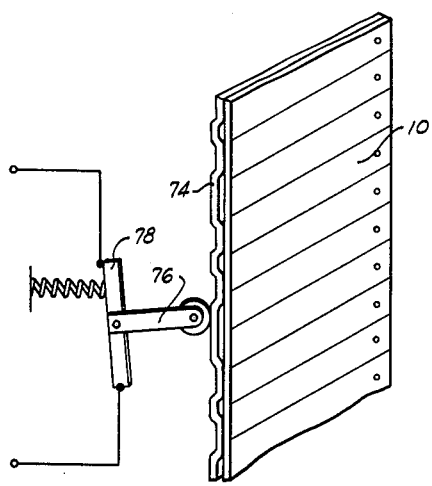
FIGURE 4 illustrates a further modification of the present invention in which tracks characterized by alternating ridges and depressions are utilized.

It will be apparent that in both the embodiments of the invention illustrated in FIGS. 1 and 3, the tracks are carried by the chart. It is thus unnecessary to provide additional elements such as cams or mechanical periodic interrupters in order to impart distinctive characteristics to each of the traces to be recorded. The novel concept of forming such tracks upon the chart, which must, in any event, be utilized in every case, can be advantageously employed in many different forms. For example, as illustrated in FIG. 4, the tracks may consist of embossed or raised portions 74 on the chart 10. A suitable follower 76 is then employed to track or scan the topography of the track, and its motions may, if desired, be converted to fluctuating electrical signals by means of a switch 78 or other suitable means.

From the foregoing it will be apparent that the present invention provides a novel method and apparatus for imparting distinguishing characteristics to a plurality of traces which are to be recorded simultaneously and/or coincidently. The fact that a plurality of heterogeneous tracks are "built into" the recording chart, and are utilized as the source of the individuality of the several traces simplifies the construction of such multiple trace recorders and renders them less subject to mechanical or electrical malfunctioning. The cost of construction and maintenance are, of course, also correspondingly reduced. Moreover, a single chart type is more easily adapted or converted to use in different types of multiple trace recorders for the purpose of imparting distinguishing characteristics to the traces than is generally true where a cam or other particular type of separate or additional part or element is utilized.

Changes may be made in the combination and arrangement of parts or elements, and in the steps of procedure as heretofore set forth in the specification and shown in the drawings, it being understood that changes may be made in the precise embodiment disclosed without departing

I claim:

1. A system for recording a variable comprising a recording chart; tracing means responsive to said variable for scribing a trace on the chart representative of said variable; means for moving said chart relatively to said tracing means; and control means for imparting a predetermined identifying characteristic to said trace, said control means comprising a track on said chart having an identifying characteristic corresponding to that imparted to said trace, and means for transmitting the characteristic of said track to said tracing means.

2. A system for recording a variable as claimed in claim 1 in which said track comprises a plurality of raised areas which protrude out of the major plane of said chart.

3. A system for recording a variable as claimed in claim 1 in which said chart is opaque and said track comprises a plurality of spaced transparent areas in said chart.

4. A system for recording a variable as claimed in claim 3 wherein said chart is sensitive to electromagnetic radiation, said means for transmitting the characteristic of said track to said tracing means comprises a source of electromagnetic radiation, and said tracing means comprises a galvanometer having a moving coil and a mirror affixed to said moving coil.

5. A system for recording a variable as claimed in claim 1 in which said means for transmitting the characteristic of said track to said tracing means comprises means for scanning said track and producing an electrical signal varying in accordance with said identifying characteristic, and means for applying said signal to said tracing means.

6. A system for recording a variable as claimed in claim 5 in which said track is a material differing substantially in electrical conductivity from the electrical conductivity of said chart.

7. A system for recording a variable as claimed in claim 5 wherein said tracing means comprises an electric stylus and said recording chart is constructed of electrically conducting material.

8. A system for recording a variable as claimed in claim 7 wherein said track comprises a plurality of spaced areas of electrically insulating material, and said scanning means includes an electrically conducting brush contacting said chart and moving over said track.

9. A multiple trace recording system comprising a recording chart; tracing means for scribing traces upon said chart; means for moving said chart relative to said tracing means; and control means for imparting a predetermined distinguishing characteristic to each of said traces, said control means comprising a plurality of heterogeneous tracks on said chart extending along the path of said chart; means for scanning one of said tracks and producing an electrical signal identifiable with the particular track scanned, and means for applying said signal to said tracing means.

10. A multiple trace recording system as claimed in claim 9 wherein said tracing means comprises a plurality of styluses, and further characterized to include a plurality of scanning means for simultaneously scanning a plurality of said tracks and each producing an electrical signal identifiable with the respective track scanned, and to include means for applying each of the several electrical signals so produced to one of said styluses.

11. A multiple trace recording system comprising a pair of spaced-apart rollers, one of which is electrically grounded; a strip chart of electrically conducting material reeled upon said rollers and spanning the space therebetween; a plurality of parallel tracks on said chart, said tracks each comprising an aligned series of small areas of electrically insulating material and each differing from each of the other of said tracks in the spatial arrangement of said areas; an electrically conducting brush contacting one of said tracks as said chart is moved; a source of electromotive force electrically connected to said brush; a high voltage generator connected to said source of electromotive force and adapted to generate high voltage when said brush contacts one of the areas of electrically insulating material in said one track; an electric stylus connected to said high voltage generator and contacting said chart to scribe a visible trace thereon when high voltage is generated by said generator; and a control motor connected to said stylus for moving said stylus transversely of said strip chart in response to a signal received by said motor, which signal is representative of a variable to be recorded.

References Cited in the file of this patent

UNITED STATES PATENTS

| | | |
|---|---|---|
| 2,678,821 | Masterson | May 18, 1954 |
| 2,775,503 | Peterson | Dec. 25, 1956 |
| 2,803,515 | Begun et al. | Aug. 20, 1957 |